(12) United States Patent
Terwilliger et al.

(10) Patent No.: US 12,098,645 B2
(45) Date of Patent: Sep. 24, 2024

(54) SUPERHEATED STEAM INJECTION TURBINE ENGINE

(71) Applicant: RAYTHEON TECHNOLOGIES CORPORATION, Farmington, CT (US)

(72) Inventors: Neil J. Terwilliger, Cheshire, CT (US); Joseph B. Staubach, Colchester, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/314,958

(22) Filed: May 10, 2023

(65) Prior Publication Data

US 2023/0374911 A1 Nov. 23, 2023

Related U.S. Application Data

(60) Provisional application No. 63/343,631, filed on May 19, 2022.

(51) Int. Cl.
*F01D 15/02* (2006.01)
*F01D 15/10* (2006.01)
(Continued)

(52) U.S. Cl.
CPC ............ *F01D 15/02* (2013.01); *F01D 15/10* (2013.01); *F01K 3/26* (2013.01); *F01K 7/16* (2013.01); *F01K 7/38* (2013.01)

(58) Field of Classification Search
CPC . F01D 15/02; F01D 15/10; F01K 3/26; F01K 7/16; F01K 7/38; F05D 2220/60;
(Continued)

(56) References Cited

U.S. PATENT DOCUMENTS 5,564,269 A * 10/1996 Briesch ................ F01K 21/042
60/39.55
5,689,948 A * 11/1997 Frutschi ................ F01K 21/047
60/774

(Continued)

FOREIGN PATENT DOCUMENTS

EP 3048281 B1 4/2017
WO 2014200597 A2 12/2014

OTHER PUBLICATIONS

European Search Report for European Application No. 23174384.0 mailed Oct. 17, 2023.

*Primary Examiner* — Jesse S Bogue
(74) *Attorney, Agent, or Firm* — Carlson, Gaskey & Olds, P.C.

(57) ABSTRACT

A turbine engine assembly includes a core engine generating a high energy gas flow that is expanded through a turbine section, a hydrogen fuel system supplying hydrogen fuel to a combustor through a fuel flow path, a condenser extracting water from the high energy gas flow, an evaporator inputting thermal energy into the water extracted by the condenser to generate a steam flow, and at least one superheater receiving the steam flow from the evaporator and input thermal energy for heating the steam flow. The steam flow from the at least one superheater is injected into the core flow path upstream of the turbine section.

18 Claims, 6 Drawing Sheets

(51) Int. Cl.
*F01K 3/26* (2006.01)
*F01K 7/16* (2006.01)
*F01K 7/38* (2006.01)

(58) Field of Classification Search
CPC .... F05D 2260/213; F02C 3/305; F02C 7/141; F02C 3/22; F02K 3/06
See application file for complete search history.

(56) References Cited

U.S. PATENT DOCUMENTS

| | | | | |
|---|---|---|---|---|
| 6,293,086 | B1* | 9/2001 | Reynolds | F02C 6/18 60/39.55 |
| 9,003,764 | B2* | 4/2015 | Thacker | F02C 6/00 122/7 B |
| 11,459,948 | B2* | 10/2022 | Uechi | F02C 3/30 |
| 2012/0159923 | A1* | 6/2012 | Freund | F02C 7/143 60/39.182 |
| 2021/0207500 | A1* | 7/2021 | Klingels | F01K 23/10 |

* cited by examiner

SUPERHEATED STEAM INJECTION TURBINE ENGINE

CROSS-REFERENCE TO RELATED APPLICATION

The present disclosure claims priority to U.S. Provisional Application No. 63/343,631 filed May 19, 2022.

TECHNICAL FIELD

The present disclosure relates generally to a hydrogen powered aircraft propulsion system and, more particularly to hydrogen steam injected turbine engine.

BACKGROUND

Reduction and/or elimination of carbon emissions generated by aircraft operation is a stated goal of aircraft manufacturers and airline operators. Gas turbine engines compress incoming core airflow, mix the compressed airflow with fuel that is ignited in a combustor to generate a high energy exhaust gas flow. Some energy in the high energy exhaust flow is recovered as it is expanded through a turbine section. Even with the use of alternate fuels, a large amount of energy in the form of heat is simply exhausted from the turbine section to atmosphere. The lost heat reduces the overall efficiency of the engine Turbine engine manufacturers continue to seek further improvements to engine performance including improvements to reduce environmental impact while improving propulsive efficiencies.

SUMMARY

A turbine engine assembly according to an example disclosed embodiment includes, among other possible things, a core engine including a core flow path where air is compressed in a compressor section, communicated to a combustor section, mixed with a hydrogen based fuel and ignited to generate a high energy gas flow that is expanded through a turbine section, a hydrogen fuel system configured to supply hydrogen fuel to the combustor through a fuel flow path, a condenser arranged along the core flow path to extract water from the high energy gas flow, an evaporator arranged along the core flow path to input thermal energy into the water extracted by the condenser to generate a steam flow, and at least one superheater arranged to receive the steam flow from the evaporator and input thermal energy for heating the steam flow, wherein the steam flow from the at least one superheater is injected into the core flow path upstream of the turbine section.

In another disclosed embodiment of the forgoing turbine engine assembly, the at least one superheater is in communication with the high energy gas flow from the combustor section.

In another disclosed embodiment of any of the forgoing turbine engine assemblies, the evaporator is in thermal communication with the high energy gas flow from the combustor section.

In another disclosed embodiment of any of the forgoing turbine engine assemblies, a preheater is in thermal communication with the high energy from the combustor section.

In another disclosed embodiment of any of the forgoing turbine engine assemblies, a steam turbine heats steam flow is expanded through the steam turbine and communicated to the combustor section.

In another disclosed embodiment of any of the forgoing turbine engine assemblies, at least one control valve controls steam flow through at least one bypass passage and the bypass passage routes steam flow around the at least one superheater.

In another disclosed embodiment of any of the forgoing turbine engine assemblies, a controller commands operation of the control valve and is programmed to direct steam flow into the bypass passage according to predefined target engine operating parameters.

In another disclosed embodiment of any of the forgoing turbine engine assemblies, the turbine section includes a high pressure turbine and a low pressure turbine and the at least one superheater is disposed to receive the high energy gas flow exhausted from the high pressure turbine and before the low pressure turbine.

In another disclosed embodiment of any of the forgoing turbine engine assemblies, the turbine section includes an intermediate turbine disposed between the high pressure turbine and the low pressure turbine, wherein the at least one superheater is disposed between the high pressure turbine and the intermediate turbine.

In another disclosed embodiment of any of the forgoing turbine engine assemblies, the evaporator is disposed between the intermediate turbine and the low pressure turbine.

In another disclosed embodiment of any of the forgoing turbine engine assemblies, a temperature of the steam flow exhausted from the at least one superheater is greater than a temperature of the steam flow exhausted from the evaporator.

In another disclosed embodiment of any of the forgoing turbine engine assemblies, the condenser communicates water to a water storage tank and a pump is configured to move water from the storage tank into the evaporator.

In another disclosed embodiment of any of the forgoing turbine engine assemblies, the turbine section includes a low pressure turbine configured to drive a fan, electric generator, or mechanical load through a low shaft.

In another disclosed embodiment of any of the forgoing turbine engine assemblies, a gearbox is coupled to the low shaft for driving the fan at a speed lower than the low pressure turbine.

A propulsion system for an aircraft according to another disclosed embodiment includes among other possible things, a core engine including a core flow path where air is compressed in a compressor section, communicated to a combustor section, mixed with a hydrogen based fuel and ignited to generate a high energy gas flow that is expanded through a turbine section, wherein the turbine section includes a high pressure turbine and a low pressure turbine, a hydrogen fuel system suppling hydrogen fuel to the combustor through a fuel flow path, a condenser arranged along the core flow path to extract water from the high energy gas flow, an evaporator placing the high energy gas flow into thermal communication with the water extracted by the condenser to generate a steam flow, at least one superheater placing the high energy exhaust gas flow into thermal communication with the steam flow to increase a temperature of the steam flow, and a steam turbine driven by expansion of the heated steam flow from the at least one superheater, wherein exhausted steam flow is communicated to the combustor section.

In another disclosed embodiment of the forgoing propulsion system, a preheater for heating water from the condenser, the preheater in thermal communication with the high energy gas flow.

In another disclosed embodiment of the forgoing propulsion system, at least one control valve controls steam flow through at least one bypass passage routing steam flow around at least one of the superheater and preheater.

In another disclosed embodiment of the forgoing propulsion system a controller commands operation of the control valve and is programmed to direct steam flow into the bypass passage according to predefined target engine operating parameters.

In another disclosed embodiment of the forgoing propulsion system, the at least one superheater, evaporator, or preheater transfers heat from a lower pressure flow to a higher pressure flow.

In another disclosed embodiment of the forgoing propulsion system, at least one turbine of the turbine section is disposed between the combustor and the superheater in the gas flow path and another of the turbines of the turbine section is disposed between the evaporator and superheater in the gas flow path.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
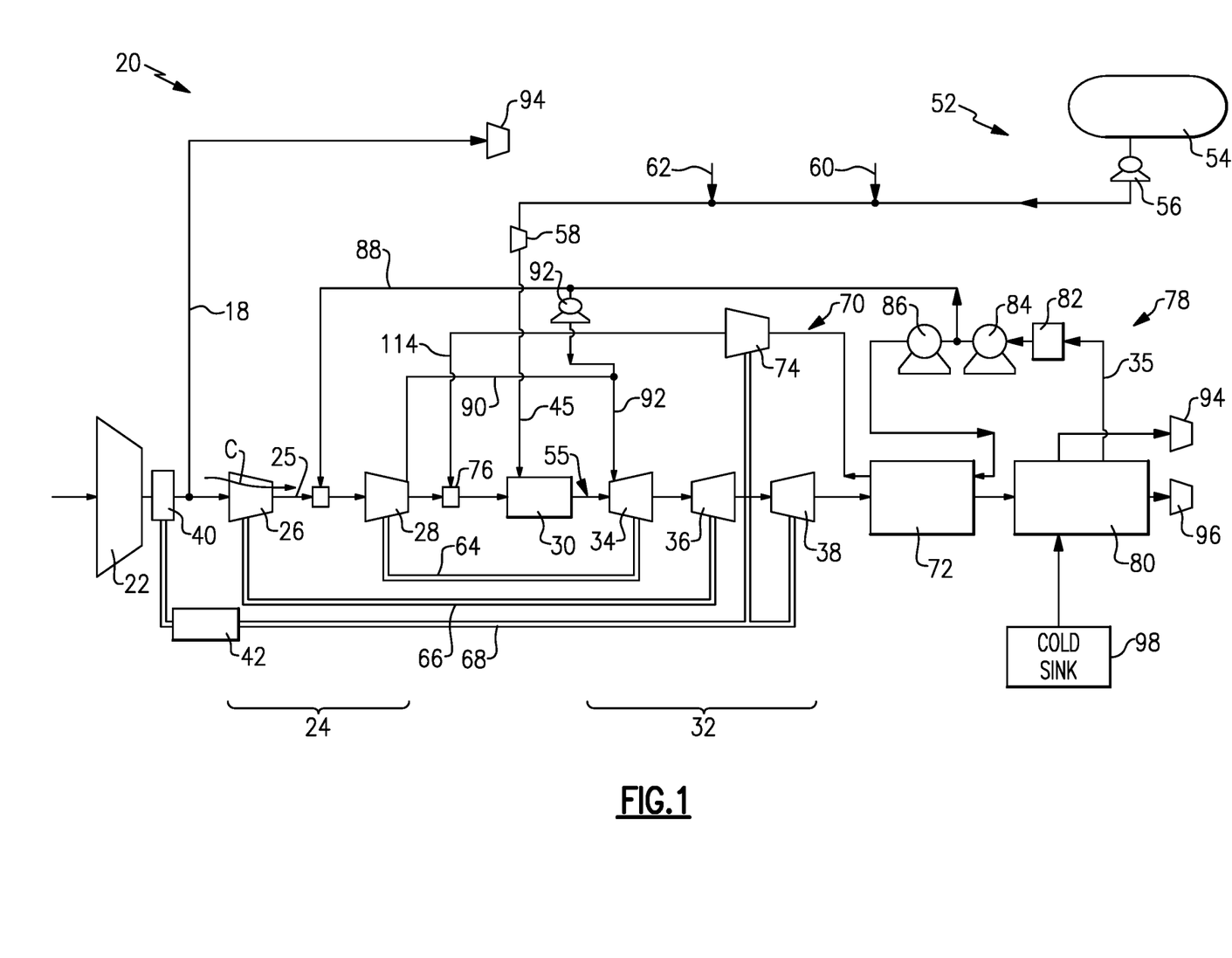
FIG. 1 is a schematic view of an example propulsion system embodiment.

FIG. 1 schematically illustrates an example hydrogen steam injected inter-cooled turbine engine that is generally indicated at 20. The engine 20 includes core engine with a core airflow path C through a fan 22, a compressor section 24, a combustor 30 and a turbine section 32. The fan 22 drives inlet air as a core flow 25 into the compressor section 24. In the compressor section 24, the core flow 25 is compressed and communicated to a combustor 30. In the combustor 30, the core flow 25 is mixed with a hydrogen ($H_2$) fuel flow 45 and ignited to generate a high energy gas flow 55 that expands through the turbine section 32 where energy is extracted and utilized to drive the fan 22 and the compressor section 24. A bypass flow 18 may flow through the fan 22, bypass the remaining components of the engine 20, and exit through a fan nozzle 94. The high energy gas flow 55 is exhausted from the turbine section 32 and communicated to a steam generation system 70 and a water recovery system 78 before being exhausted through a core nozzle 96.

The engine 20 is configured to burn hydrogen provide by a fuel system 52. The fuel system 52 includes a liquid hydrogen ($LH_2$) tank 54 in communication with at least one pump 56. The pump 56 drives a fuel flow 45 to the combustor 30. $LH_2$ provides a thermal heat sink that can be utilized to cool various heat loads within the aircraft indicated at 60 and in the engine as indicated at 62. The heat loads may include, for example and without limitation, super conducting electrics, a working fluid of an environmental control system of the aircraft, an air conditioning heat exchanger, and engine working fluid heat exchangers. Heat accepted into the hydrogen fuel flow increase the overall fuel temperature prior to injection into the combustor 30.

A hydrogen expansion turbine 58 may be provided to reduce the pressure of the $LH_2$ fuel flow through expansion prior to communication to the combustor 30. Expansion in the expansion turbine 58 provides for the tailoring of temperatures and pressures of the fuel flow communicated to the combustor 30 while maintaining the fuel flow in a gas form.

The steam injection system 70 uses the exhaust heat to generate a steam flow 106 by evaporating high pressure water through an evaporator 72. The generated steam may then be injected into compressed core airflow at a location 76 for communication into the combustor 30 to improve performance by increasing turbine mass flow and power output without additional work required by the compressor section. In one example embodiment the location 76 is upstream of the combustor 30. Steam flow from the evaporator 72 may drive a steam turbine 74 to provide an additional work output prior to injection into the combustor 30.

The water recovery system 78 draws water, schematically indicated at 35, from the high energy gas flow 55 and communicates the recovered water to water storage tank 82. The water storage tank 82 operates as an accumulator to provide sufficient water for operation during various engine operating conditions. A condenser/water separator 80 is provided downstream of the turbine section 32 and the evaporator 72. The condenser/separator 80 is in communication with a cold sink, schematically indicated at 98 for the condenser/separator 80 may be, for example, ram or fan air depending on the application and/or engine configuration.

The disclosed example engine embodiment 20 has an increased power output from the injected steam 106 due to an increasing mass flow through the turbine section 32 without a corresponding increase in work from the compressor section 24.

The water recovery system 78 includes the water storage tank 82 that receives water from the condenser/water separator 80 and provides for the accumulation of a volume of water required for production of sufficient amounts of steam. Water recovered from the exhaust gas flow is driven by a low pressure pump 84 and a high pressure pump 86 to the evaporator 72.

A water intercooling flow 88 may be communicated to the compressor section 24 to reduce a temperature of the core airflow 25 and increase mass flow. Reduced temperatures provided by injection of water reduces compressor work load. Water may also be used as a cooling flow 92 to cool cooling air flow 90 communicated from the compressor section 24 to the turbine section 32.

The example compressor section 24 includes a low pressure compressor (LPC) 26 and a high pressure compressor (HPC) 28. The turbine section 32 includes a high pressure turbine (HPT) 34, an intermediate pressure turbine (IPT) 36, and a low pressure turbine (LPT) 38. The turbines 34, 36 and 38 are coupled to a corresponding compressor section. In this disclosed example, the high pressure turbine is coupled by a high shaft 64 to drive the high pressure compressor 28.

An intermediate shaft 66 couples the intermediate turbine 36 to the low pressure compressor 26.

A low shaft 68 is coupled to the low pressure turbine 38 and a gearbox 40 to drive the fan 22. The low shaft 68 may further be coupled to an electric machine 42 that is configured to impart and/or extract power into the low shaft 68. The example gearbox 40 is an epicyclical gear train, such as a planetary gear system, star gear system or other known gear system, with a gear reduction ratio of greater than about 2.3.

Although the example engine 20 is described and shown by way of example as a three spool engine, other engine configurations, such as two-spool may also benefit from this disclosure and are within the contemplation and scope of this disclosure. Moreover, although the example engine 20 is disclosed by way of example as part of a propulsion system for an aircraft, the engine 20 may be provide a shaft power output utilized for driving a generator, machine or any other device.

Power generated by the steam flow 114 is limited by the amount of available thermal energy within the exhaust gas flow 55 exiting the turbine section 32. The temperature of the steam may thereby limit any amount of additional power that may be obtained from the steam turbine 74.

Figure 2:
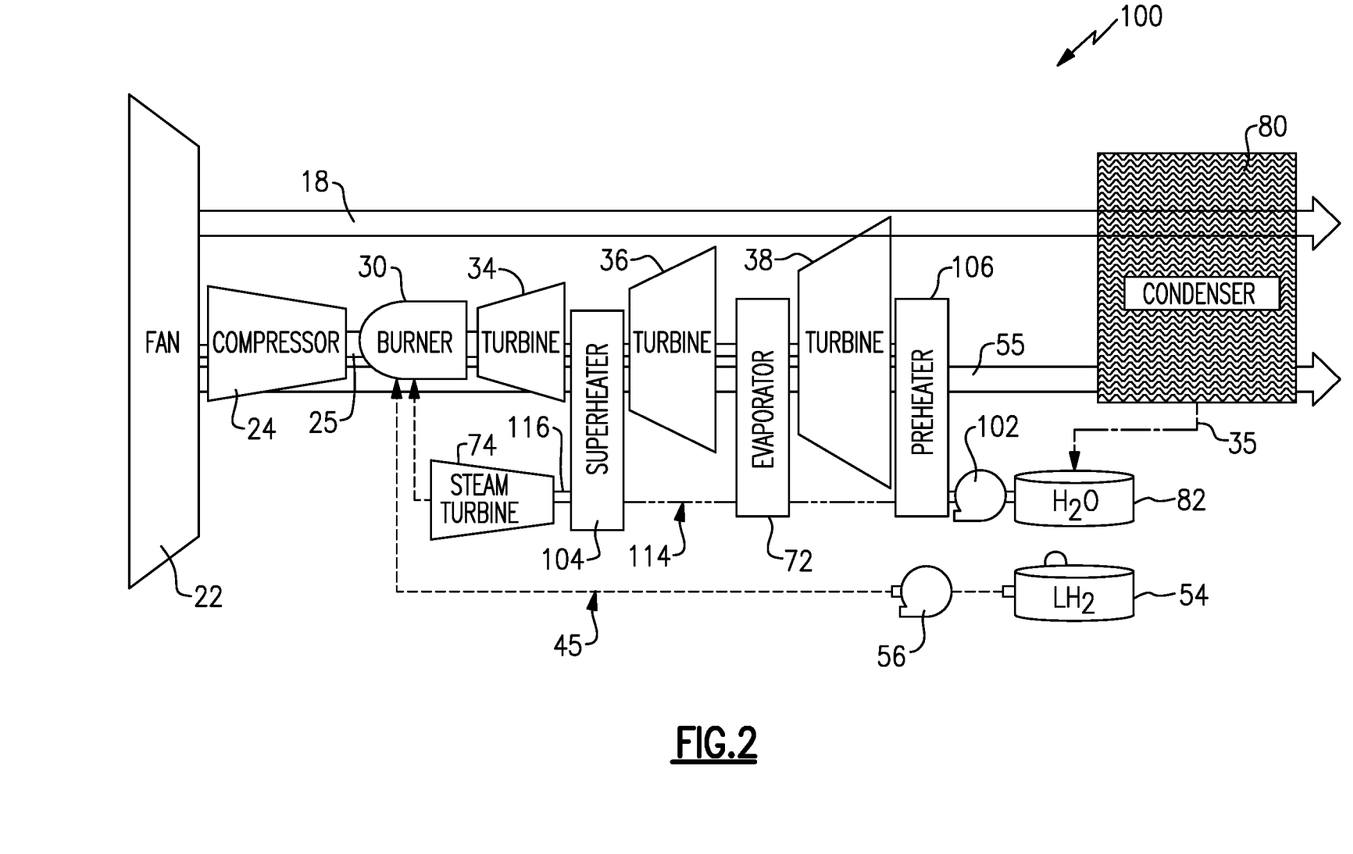
FIG. 2 is a simplified schematic view of another example propulsion system embodiment.

Referring to FIG. 2, another example engine 100 is shown in a simplified schematic view and includes a superheater 104 to increase a temperature of the steam flow 114 communicated to the combustor 30. Power generated by the steam turbine 74 is increased as compared to the previous embodiment by providing thermal communication between the water and/or steam flow at a location that is hotter than aft of the turbine section 32. In one disclosed example, a superheater 104 is provided between the high pressure turbine 34 and the intermediate turbine 36. The hot gas flow 55 between the high pressure turbine 34 and the intermediate turbine 36 is of a greater temperature and thereby able to further heat the steam flow 114.

Additionally, in this example engine embodiment 100, the evaporator 72 is located between the intermediate pressure turbine 36 and the low pressure turbine 38. The location of the evaporator 72 within the turbine section 32 instead of aft of the turbine section provides for an increase in thermal energy that may be absorbed by the steam flow 114.

A preheater 106 may be provided aft of the low pressure turbine 38 to impart thermal energy into a water flow communicated from the condenser 80 by way of the water storage tank 82. Accordingly, water gathered in liquid form by the condenser 80 is initially heated by the preheater 106. The initial heating of water in the preheater 106 is not sufficient to transform the water into steam.

The preheated water flow from the preheater 106 is communicated to the evaporator 72. Additional thermal energy is input into the preheated water flow and transformed into a steam flow. Steam flow from the evaporator 72 is communicated to the superheater 104. The superheater 104 further inputs thermal energy into the steam flow to generate a superheated steam flow 116. The superheated steam flow 116 is expanded through the steam turbine 74 to generate shaft power. Steam flow exhausted from the steam turbine 74 is then communicated to the combustor 30 to increase mass flow of the high energy gas flow 55.

Figure 3:
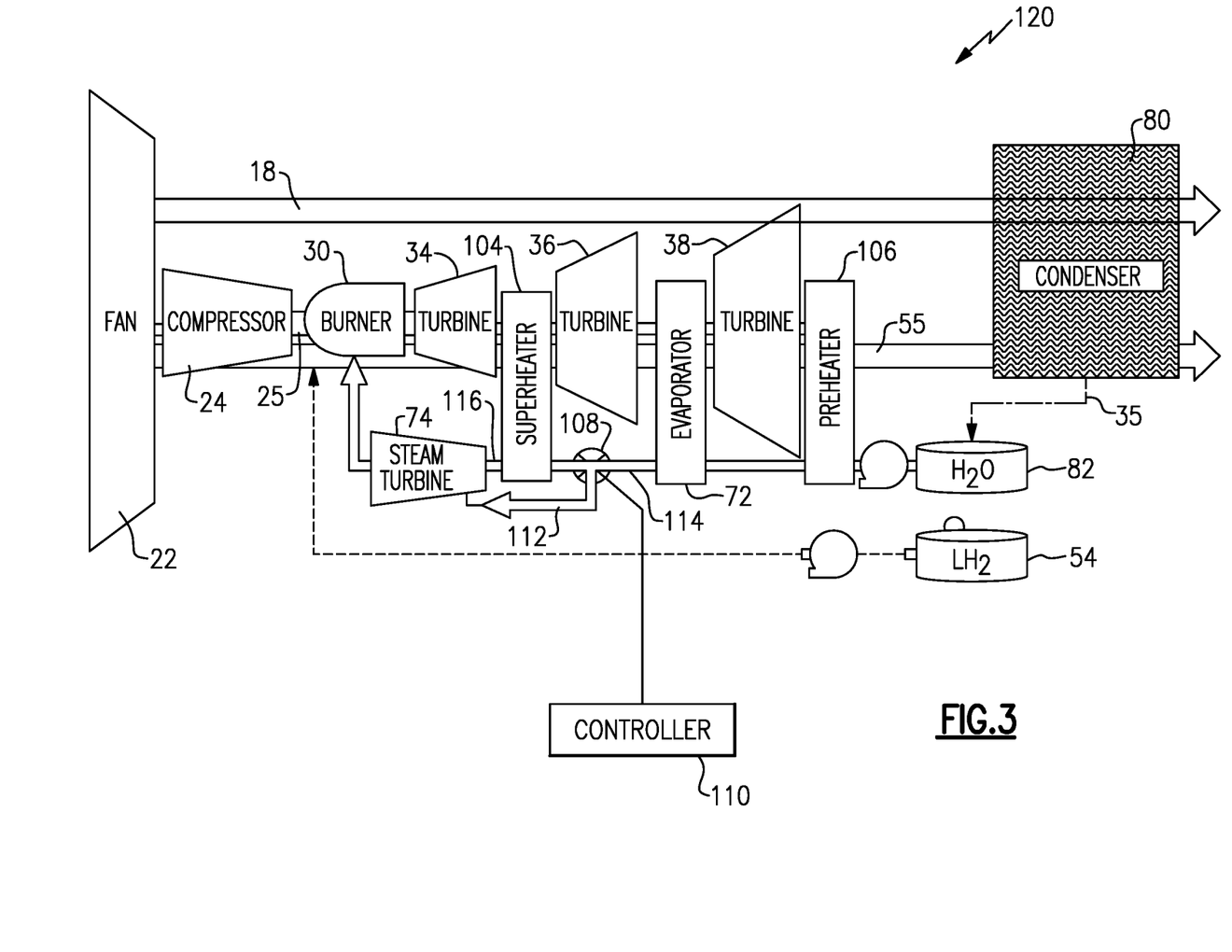
FIG. 3 is a schematic view of another example propulsion system embodiment.

Referring to FIG. 3, another example engine 120 is schematically shown and includes a control valve 108 that controls flow through a bypass flow passage 112. A controller 110 is programmed to govern operation of the control valve 108 to bypass a portion of the steam flow 114 to tailor engine operation according to predefined operating parameters.

As appreciated, the heating of the steam flow by gas flows within the turbine section 32 may reduce turbine work of turbines 36 and 38 while increasing work of steam turbine 74. Removal of thermal energy from the gas flows through the turbine sections is controlled by bypassing the superheater 116. The bypass passage 112 routes steam flow 114 directly from the evaporator 72 to the steam turbine 74. Bypassing the superheater 116 provides for tailoring of engine operation to accommodate predefined engine operating conditions.

In this disclosed engine embodiment, the control valve 108 routes steam flow through the bypass passage 112 rather than draw thermal energy from the turbine section aft of the high pressure turbine 34. Moreover, although one control valve 108 is shown and disclosed by way of example, a number of control valves could be utilized to route steam flows around each of the evaporator 72 and the preheater 106 to provide for tailoring of engine operation according to predefined engine operating parameters.

It should be understood that the arrangement of the superheater 104, evaporator 72 and preheater 106 is shown by way of example with regard to the location within the turbine sections 34, 36 and 38. Alternate locations and combinations of the superheater 104, evaporator 72 and the preheater 106 may be utilized and are within the contemplation of this disclosure. Moreover, not all of the superheater 104, evaporator 72 and preheater 106 may be needed to provide a desired steam flow to the steam turbine 74 and the combustor 30.

Figure 4:
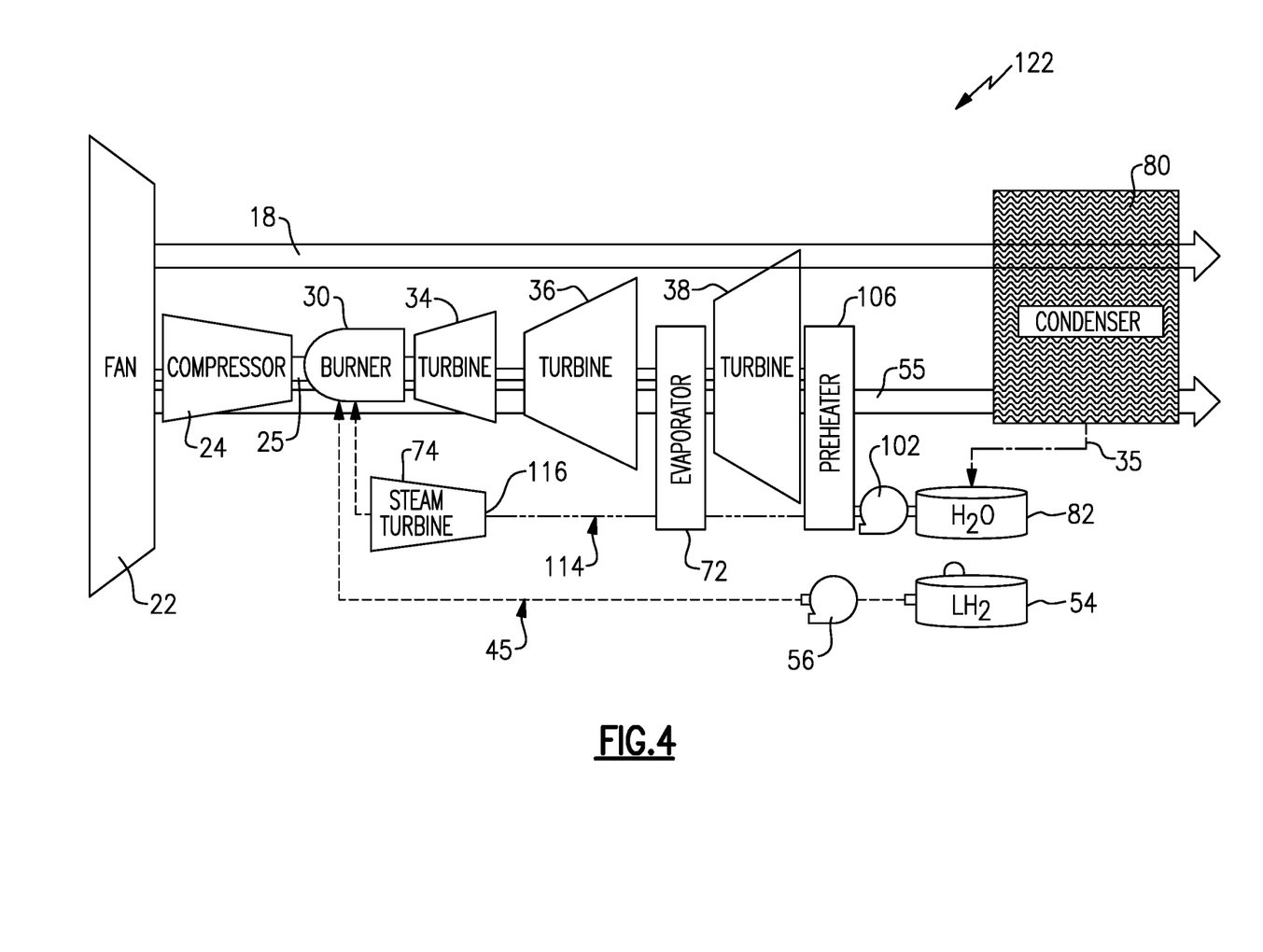
FIG. 4 is a simplified schematic view of another example propulsion system embodiment.

Referring to FIG. 4, another example engine embodiment 122 is schematically shown and includes the evaporator 72 disposed between the intermediate turbine 36 and the low pressure turbine 38. The evaporator 72 receives preheated water flow from the preheater 106. In the evaporator 72, thermal energy transforms the water flow into a steam flow 114 that is communicated directly to the steam turbine 74.

Figure 5:
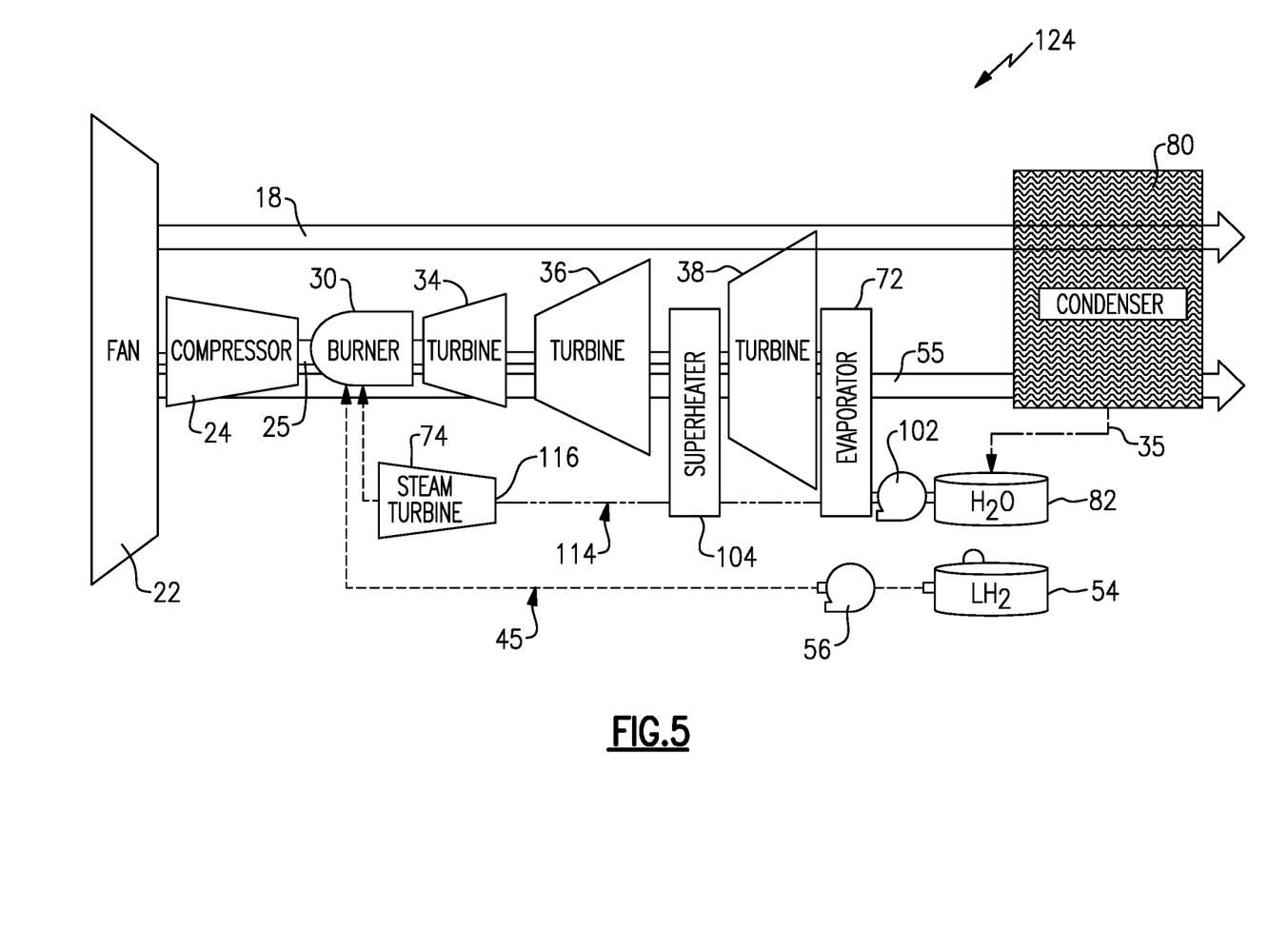
FIG. 5 is a simplified schematic view of another example propulsion system embodiment.

Referring to FIG. 5, another example engine embodiment 124 is schematically shown and includes the superheater 104 and the evaporator 72. In this example embodiment, the superheater 104 s disposed after the IPT 36 and before the LPT 38. The evaporator 72 is disposed aft of the LPT 38. In this disclosed embodiment, the thermal energy input into the waterflow aft of the LPT 38 is sufficient to transform the liquid water into steam. The steam flow is further heated in the superheater 104 and communicated to the steam turbine 74.

Figure 6:
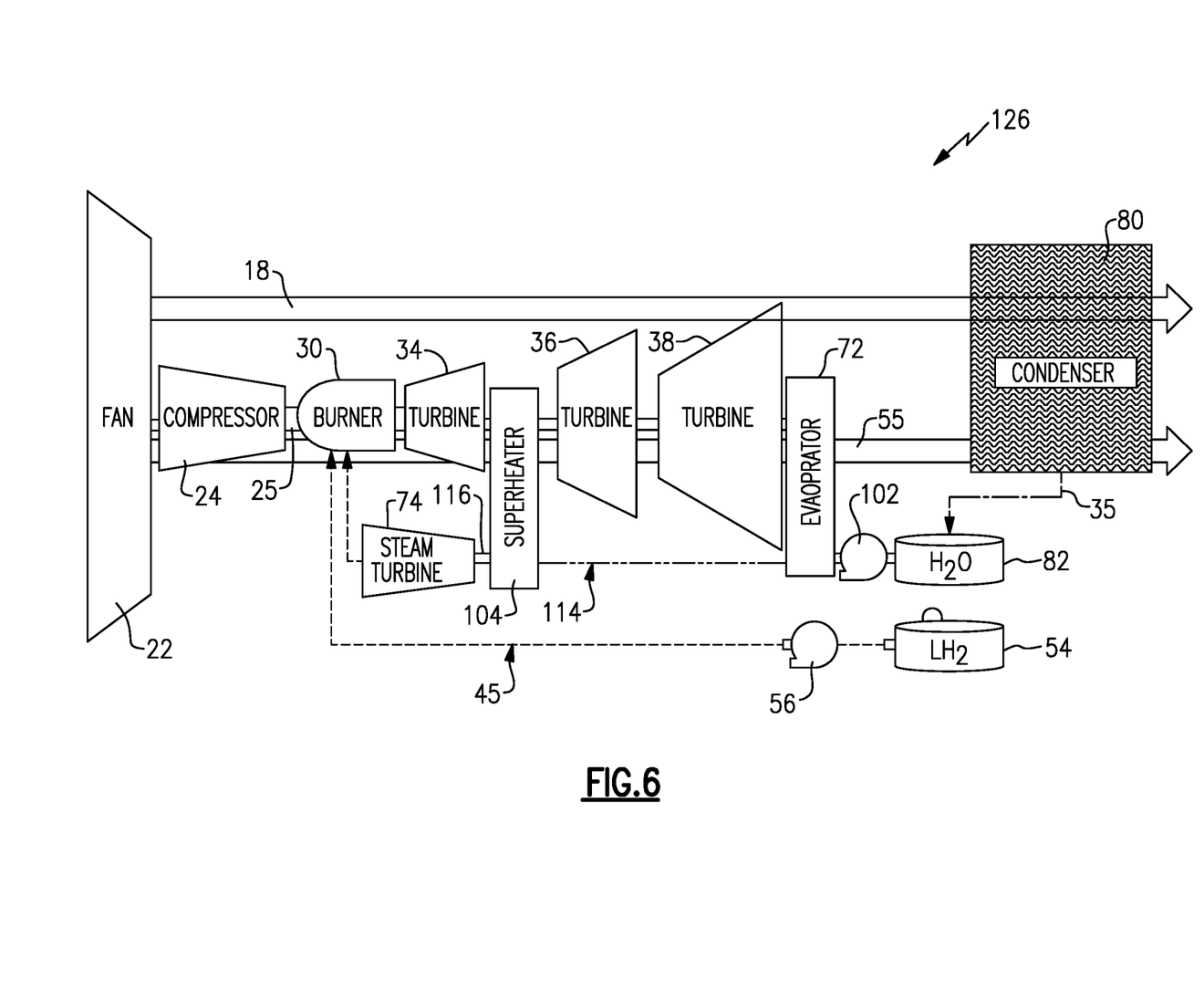
FIG. 6 is a simplified schematic view of another example propulsion system embodiment.

Referring to FIG. 6, another example engine embodiment is schematically shown and indicated at 126 and includes the superheater 104 and the evaporator 72. In this disclosed embodiment, the superheater 104 is disposed between the HPT 34 and the IPT 36 and the evaporator 72 is arranged aft of the LPT 38. The location of the superheater 104 is tailored to the available thermal energy and requirements for driving the steam turbine 74 and providing steam to the combustor 30. In this disclosed example, the superheater 104 is disposed at a location that provides for the desired superheating of the steam flow 114.

Accordingly, the example engines provide for the recapture and use of additional thermal energy by heating the steam with the gas flow at varying locations with differing and greater temperatures.

Although an example engine configuration is described by way of example, it will be appreciated that other engine configurations may include additional structures and features and are within the contemplation and scope of this disclosure.

Accordingly, the disclosed assemblies provide for the advantageous use of ammonia fuel to improve engine efficiency and reduce carbon emission. The disclosed systems use the advantageous thermal capacity of ammonia to maximize the recapture of heat and cool other working flows of the engine.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A turbine engine assembly comprising:
a core engine including a core flow path where air is compressed in a compressor section, communicated to a combustor section, mixed with a hydrogen based fuel and ignited to generate a high energy gas flow that is expanded through a turbine section;
a hydrogen fuel system configured to supply hydrogen fuel to the combustor through a fuel flow path;
a condenser arranged along the core flow path to extract water from the high energy gas flow;
an evaporator arranged along the core flow path to input thermal energy into the water extracted by the condenser to generate a steam flow; and
at least one superheater arranged to receive the steam flow from the evaporator and input thermal energy for heating the steam flow, wherein the steam flow from the at least one superheater; and wherein the turbine section includes a high pressure turbine and a low pressure turbine, the at least one superheater is disposed to receive the high energy gas flow exhausted from the high pressure turbine and before the low pressure turbine.

2. The turbine engine assembly as recited in claim 1, wherein the at least one superheater is in communication with the high energy gas flow from the combustor section.

3. The turbine engine assembly as recited in claim 2, wherein the evaporator is in thermal communication with the high energy gas flow from the combustor section.

4. The turbine engine assembly as recited in claim 3, including a preheater in thermal communication with the high energy from the combustor section.

5. The turbine engine assembly as recited in claim 4, including a steam turbine, wherein the heated steam flow is expanded through the steam turbine and communicated to the combustor section.

6. The turbine engine assembly as recited in claim 5, including at least one control valve controlling steam flow through at least one bypass passage, the bypass passage configured to route steam flow around the at least one superheater.

7. The turbine engine assembly as recited in claim 6, including a controller commanding operation of the control valve, the controller programmed to direct steam flow into the bypass passage according to predefined target engine operating parameters.

8. The turbine engine assembly as recited in claim 1, wherein the turbine section includes an intermediate turbine disposed between the high pressure turbine and the low pressure turbine, wherein the at least one superheater is disposed between the high pressure turbine and the intermediate turbine.

9. The turbine engine assembly as recited in claim 8, wherein the evaporator is disposed between the intermediate turbine and the low pressure turbine.

10. The turbine engine assembly as recited in claim 1, wherein a temperature of the steam flow exhausted from the at least one superheater is greater than a temperature of the steam flow exhausted from the evaporator.

11. The turbine engine assembly as recited in claim 1, including a water storage tank and the condenser communicates water to the water storage tank and a pump is configured to move water from the storage tank into the evaporator.

12. The turbine engine assembly as recited in claim 1, wherein the turbine section includes a low pressure turbine configured to drive a fan, electric generator, or mechanical load through a low shaft.

13. The turbine engine assembly as recited in claim 12, including a gearbox coupled to the low shaft for driving the fan at a speed lower than the low pressure turbine.

14. A propulsion system for an aircraft comprising:
a core engine including a core flow path where air is compressed in a compressor section, communicated to a combustor section, mixed with a hydrogen based fuel and ignited to generate a high energy gas flow that is expanded through a turbine section, wherein the turbine section includes a high pressure turbine and a low pressure turbine;
a hydrogen fuel system suppling hydrogen fuel to the combustor through a fuel flow path;
a condenser arranged along the core flow path to extract water from the high energy gas flow;
an evaporator placing the high energy gas flow into thermal communication with the water extracted by the condenser to generate a steam flow;
at least one superheater placing the high energy exhaust gas flow into thermal communication with the steam flow to increase a temperature of the steam flow; and
a steam turbine driven by expansion of the heated steam flow from the at least one; and wherein at least one turbine of the turbine section is disposed between the combustor and the superheater in the gas flow path and another of the turbines of the turbine section is disposed between the evaporator and superheater in the gas flow path.

15. The propulsion system as recited in claim 14, including a preheater for heating water from the condenser, the preheater in thermal communication with the high energy gas flow.

16. The propulsion system as recited in claim 14, including at least one control valve controlling steam flow through at least one bypass passage routing steam flow around at least one of the superheater and preheater.

17. The propulsion system as recited in claim 16, including a controller commanding operation of the control valve, the controller programmed to direct steam flow into the bypass passage according to predefined target engine operating parameters.

18. The propulsion system as recited in claim 14, wherein the at least one superheater, evaporator, or preheater transfers heat from a lower pressure flow to a higher pressure flow.

* * * * *